(No Model.)

J. LAJEUNESSE.
VEHICLE WHEEL HUB.

No. 260,999. Patented July 11, 1882.

Witnesses:
H. Morey
C. R. McDowell

Inventor
Jules Lajeunesse,
Per R. A. Mellon
Attorney.

UNITED STATES PATENT OFFICE.

JULES LAJEUNESSE, OF MONTREAL, QUEBEC, CANADA, ASSIGNOR OF ONE-HALF TO EDMOND ARMANT, OF SAME PLACE.

VEHICLE-WHEEL HUB.

SPECIFICATION forming part of Letters Patent No. 260,999, dated July 11, 1882.

Application filed April 13, 1882. (No model.)

*To all whom it may concern:*

Be it known that I, JULES LAJEUNESSE, of the city of Montreal, in the district of Montreal and Province of Quebec, Canada, have invented certain new and useful Improvements in Hubs for Vehicle-Wheels; and I do hereby declare that the following is a full, clear, and exact description of the same.

This invention relates to improvements in that class of hubs in which metallic bands are used for the purpose of strengthening the joints between the hub and the spokes and for preventing the wood center from splitting.

My improvements have for their object to improve the appearance of the hub and render same as symmetrical and light as the most finely-finished hard-wood hub, allowing the use of cheaper wood than at present, and at the same time to greatly strengthen the same, prevent it from splitting as the spokes are driven in, and allow the ordinary machine-made spoke with plain tenon and shoulders to be used without any liability of said shoulders being split off in driving same or from the jolting of the vehicle. In fine, my spokes are bound firmly in and to the hub, and the hub also is preserved from all danger of splitting.

My invention consists in the combination, with a wooden hub mortised in the usual way, of a plain thin metallic band surrounding the hub, and provided with mortises to match those in the hub, but larger than the latter and beveled on their inner sides. The tenons of the spokes are driven into the mortises in the wooden hub through the larger mortises in the metallic band, and the shoulders of said spokes thus bear upon ledges formed by the peculiar manner in which the metallic band fits the wooden hub, the beveled inner edges of the mortises in said metallic band forming seats for the spokes.

For a more complete comprehension of my invention reference must be had to the annexed drawings, in which similar letters of reference indicate like parts, and where—

Figure 1:
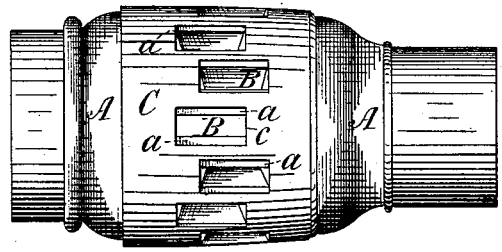
Figure 2:
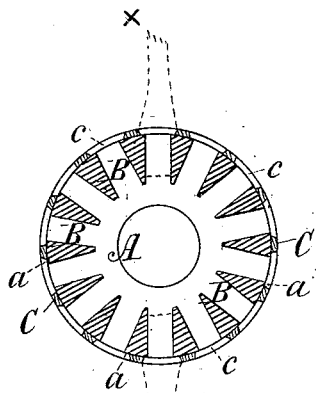
Figure 3:
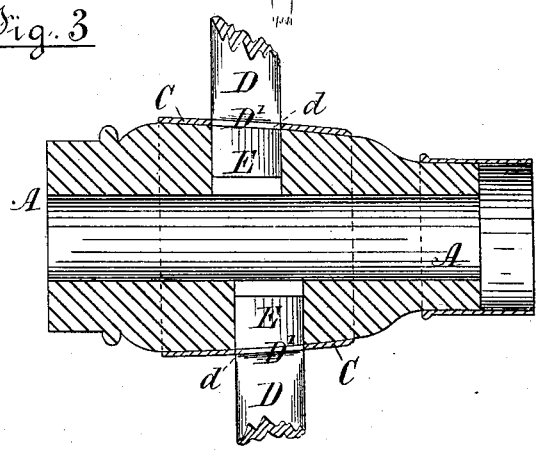

Figure 1 is a side elevation of hub with metallic band in place, but without spokes; Fig. 2, a cross-section of same on line $x\ x$; Fig. 3, a longitudinal section with spokes in place, and Fig. 4 a detail of spoke.

In these drawings I have shown the hub and metallic band constructed with "dodging-mortises;" but it will be understood that my invention is equally applicable to hubs in which the mortises are in a line with each other. My invention, however, has particularly beneficial results when used with dodging-mortises.

A is the wooden hub, turned in the usual or any approved way, and provided with mortises B B for the spokes. As shown in Fig. 1, this hub is slightly conical or beveled from inside to outside; but this form is not absolutely necessary.

Over the wooden hub is slipped a circumferential metallic band, C, of just sufficient size or diameter to slide easily into place. This band C is provided with oblong slots or mortises $c\ c$, one for each mortise in the hub A; but these slots $c\ c$ are somewhat larger than the mortises B B, so that when the band C is in place ledges $a\ a$ will appear on the hub at each side of mortises. The inner edges of the slots or mortises $c\ c$ are beveled, as shown particularly in Fig. 2.

Figure 4:
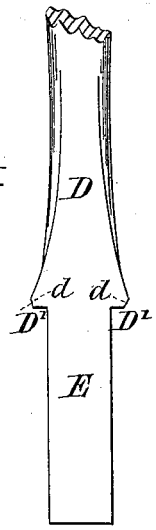

In Fig. 4 I have shown a detail of the ordinary plain spoke, D, but with its shoulders D' D' slightly beveled, as shown at $d\ d$, just above its tenon E.

When the spokes D are driven into the hub the tenons E, as usual, fit into the mortises B B, but their shoulders D' D' rest on the ledges $a\ a$ and the beveled edges $d\ d$ fit tightly against the beveled edges of mortises in the metallic band C, which thus form seats for the same. When the spokes D are all driven into their mortises the wooden hub A becomes swollen, so as to make the circumferential metallic band C fit it very tightly, and this band being very thin, it has no clumsy or unsightly appearance when the wheel is finished.

It will be seen that by my invention the spokes D are so bound in the hub A and its band C that there will be no chance of the tenons E breaking off, as they do at present, just below the shoulders D', all strain at that point being removed, and the edges of these shoulders being beveled and bound inside the metallic band, and the shoulders themselves bearing directly on material of just equal resistance to themselves, there is no possibility of the shoulders being split off by the concussion of the vehicle or by being driven in too hard while the wheel is being constructed.

I am aware that hubs have been made of wood and bands of metal slipped over same at their ends; also, that metal bands with upright flanges, between which the spokes are held by rivets or bolts, have been used on wooden hubs; but none of these devices embody the features peculiar to my present invention, inasmuch as that the specially-desired method of dodging the mortises and spokes cannot be carried out in the latter case without rendering the hub very unsightly; and, further, although in the former case, where a plain mortised band is used, the ordinary spoke herein shown can be employed, no provision is made to allow the spoke-shoulders to bear on the wooden hub, which is absolutely necessary to prevent their breaking sooner or later, and the tenons are in all cases bound to break off at their weakest points.

What I claim, and desire to secure by Letters Patent, is as follows:

The combination of the mortised wooden hub A, the encircling metallic ring having corresponding mortises with beveled edges and of greater diameter than those in the hub, and the tenoned spokes D, having a plane bearing-shoulder to rest on the outside of the hub within the mortise in the band, and also having inclines $d$ to bear on the beveled edges of such mortise.

JULES LAJEUNESSE.

Witnesses:
T. C. MOREY,
R. A. KELLOND.